June 19, 1945. P. A. SIDELL ET AL 2,378,801
METHOD AND PRODUCT OF JOINING PREFORMED PLASTIC MEMBERS
Filed Aug. 28, 1941

INVENTOR
PHILIP A. SIDELL +
EDWARD J. WELLMAN
BY
Wheeler, Wheeler & Wheeler
ATTORNEYS.

Patented June 19, 1945

2,378,801

UNITED STATES PATENT OFFICE 2,378,801

METHOD AND PRODUCT OF JOINING PREFORMED PLASTIC MEMBERS

Philip A. Sidell and Edward J. Wellman, Galesburg, Ill., assignors to Outboard Marine & Manufacturing Company, Galesburg, Ill., a corporation of Delaware Application August 28, 1941, Serial No. 408,666

3 Claims. (Cl. 20—35)

This invention relates to a novel method of joining preformed plastic members, and to products assembled by said method.

The primary object of the invention resides in the provision of a method whereby one or more preformed members or articles of plastic composition may be quickly and economically joined in fused relation to produce a unitary structure, the joined portions of which possess substantially the same tensile strength and rigidity as the preformed portions; said joining being accomplished without the use of bolts, rivets, or the like.

More specifically, it is an object of the invention to develop directly at the surfaces to be joined, a temperature sufficiently high to effect the fusion of such surfaces while maintaining them under pressure, without requiring heat transmission through portions of the members adjacent such surfaces.

Another object is to provide novel means for applying heat to molded plastic sections and concentrating said heat within a preselected area during joining of plastic members by fusion.

Another object is to provide a method of welding plastics by heat developed or applied directly between the surfaces to be joined.

A further object is generally to improve and simplify the assembly of plastic structures, with special reference to built-up plastic articles such as domestic refrigerator evaporator doors and the like.

In the drawing:

Fig. 2 is a fragmentary view showing plastic members clamped together as during the joining operation.

Like parts are identified by the same reference characters throughout the several views.

The invention is applicable to the use of thermoplastics generally. Examples are the plastics sold under the trade name of "Polystyrene" and under the trade name "Tenite No. 2," and any of the cellulose acetate group of plastics.

Plastic molders have insisted that there was no way of connecting prefabricated plastic parts save by rivets or screws or the like, but in practice it is found that parts so connected do not have adequate rigidity in the particular field in which this invention is particularly useful. Attempts to fuse the parts under pressure by means of heat derived through the pressure mediums resulted in the undue softening of the bodies to be joined before sufficient heat was communicated through the bodies from the clamping jaws to effect fusion. The present invention contemplates the fusion of parts by means of heat developed directly between the surfaces to be fused while maintaining such surfaces under a continuing compressive force adequate to embed the heating element when the heat of fusion is reached to produce an extremely strong and reinforced joint without so softening contiguous portions of the preformed articles as to result in deformation thereof.

The invention has particular utility in the manufacture of evaporator doors for domestic refrigerators from separate preformed sections. The preformed sections may be made up in different colors if desired, and may be made interchangeable with other sections to produce any requisite color scheme from low cost standard parts. By way of illustration the invention is exemplified as applied to the construction of evaporator doors from preformed sections.

Figure 1:
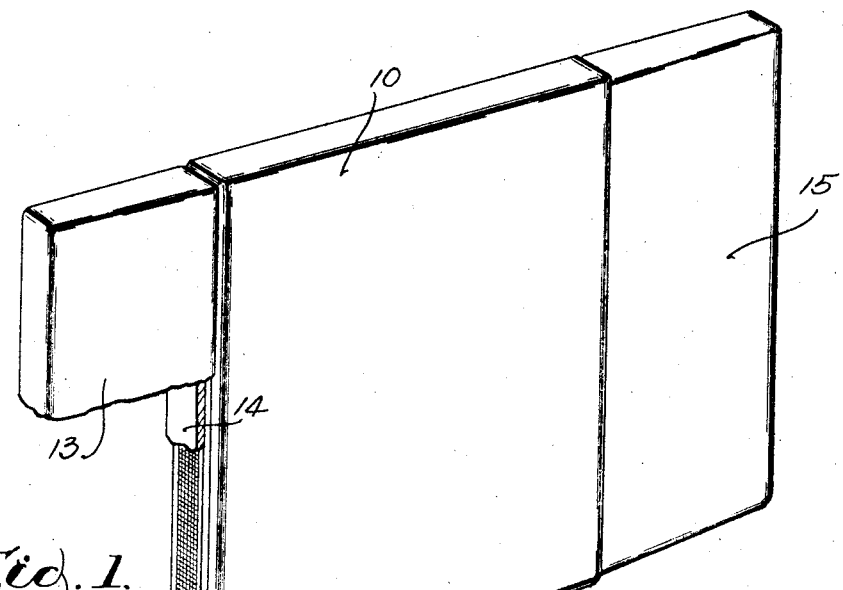
Fig. 1 is a view in perspective of a refrigerator evaporator door comprising individual sections unitarily joined by the method herein set forth, with parts broken away to illustrate details of the joint.
Figure 3:
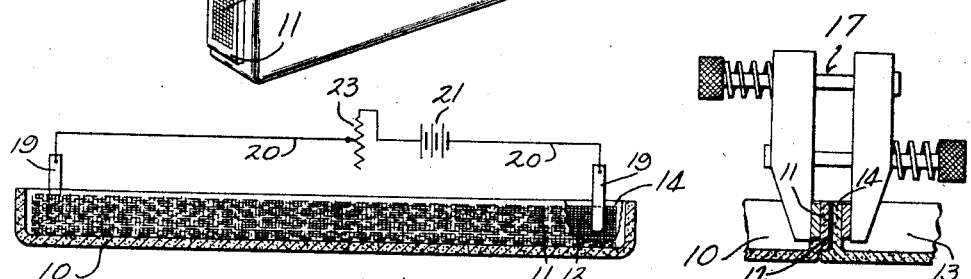
Fig. 3 illustrates, diagrammatically, electric means conductively coupled to a resistance element to provide heat for fusing complementarily engaged plastic members.

As shown in Figs. 1, 2 and 3, the improved method of joining individual members or sections contemplates the employment of a resistance type heating element interposed between abutted or contiguous portions of the sections to be joined, at least one of which is thermo-plastic, the element being embedded into the thermoplastic during the joining operation and becoming a part of the joint. Thus, as shown in Fig. 1, an evaporator door for a domestic refrigerator may be assembled as follows, it being apparent that any other desired plastic structure may be assembled by a like method.

A preformed central tray-like section 10 has a flat side wall area 11 against which a metallic heating element 12, which may be a strip of screen cloth, is positioned. A tray-like section 13 is pressed toward the side of tray 10 and the intervening heating element 12. In the present structure a second tray-like section 15 is mounted at the opposite side of the central tray 10 to produce a symmetrical door assembly, but since it is joined by an identical process, duplicate description is herein eliminated. If desired, marginal portions of the various trays may be provided with offset areas to effect mechanically interlocking engagement therebetween as shown in Figs. 1 and 2, whereby to aid in positioning and strengthening the respective sections.

Clamping means, such as spring clamps 17, are then brought into engagement with the side members 11 and 14 to maintain the sections resiliently pressed against interposed heating element 12. Element 12 is then heated sufficiently to raise the temperature of the immediately engaged plastic to the point of fusion thereof. During the heating operation the surface of the thermo-plastic softens prior to reaching the fusion point and the surface portions 11 and 12 are brought into mutual contiguous abutment under the urge of clamp 17, as the heating element is embedded partly in one section, and partly in the other (assuming both to be thermoplastic). As the point of fusion is reached, the continued resilient pressure embeds the heating element 12 and, by reason of the fusion, the two members become joined as an integral mass. Just enough heat is applied to element 12 to effect a strong joint, at which point the heating is discontinued, the sections being allowed to completely set before the clamps are removed. The heating element, being embedded in the material at the joint, provides reinforcing means to increase the rigidity and tensile strength of material at that point. As a result, joints formed in this manner have been found to be substantially equal in strength to other portions of the members, even though complete fusion of the plastic does not occur over the entire abutting areas. A solid heating element may be employed if of a material to which the plastic will strongly adhere. However, a foraminous element is ordinarily preferred.

The very characteristics of the plastics which make it impracticable to attempt to fuse them by means of heat developed in the clamps or communicated to the abutting surfaces through any portion of the plastic bodies, here acts to assist in the development of a perfect joint. Although the contiguous surfaces of the plastic members to be joined are heated to the fusion point of one or both of them, the main body of plastic behind such surfaces, as well as the plastic remote from the heating element in the plane of such surfaces, remains below the fusing temperature and consequently retains its form under the clamping pressure. But for this, an irregular joint might result. Because it is possible to localize the fusion in the immediate vicinity of the heating element, it is also possible to terminate the heating before the extreme margins of the members shown in the drawing are affected. Thus these margins retain their original form and finish, and no finishing operation following the heat treatment is necessary.

Heating of element 12 may be accomplished in one of several ways. As shown in Fig. 3, it may be accomplished electrically by direct conduction, the ends of the elements being connected through connectors 19 and conduit 20 to a source of electric energy 21, which is preferably of low voltage and high amperage. A variable resistance 23 may be included in the circuit to control the amount of current flow through the element. Connectors 19 may be extended to contact with element 12 in any suitable manner, as by extending through portions of the plastic, to be later removed, or element 12 may be extended beyond the ends of the section side wall to be trimmed off after the fusing operation.

Figure 4:
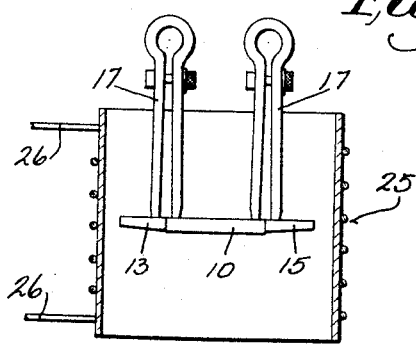
Fig. 4 illustrates an alternate embodiment of the invention wherein induction currents are employed to fuse the plastic.

An alternate method of heating the element is diagrammatically shown in Fig. 4, wherein the element is subjected to electromagnetic induction for the heating thereof. This may be accomplished by using a well known induction coil 25, connected to a suitable source of current through conduits 26, and in which the clampingly engaged sections are disposed during the heating operation. If desired, it may be accomplished by using a well known induction coil 25, connected to a suitable source of current through conduits 26, and in which the clampingly engaged sections are disposed during the heating operation. If desired, it may be accomplished through other suitable induction means, using either high or low frequencies, there being no necessity for employing a furnace due to the fact that only the heating element and plastic contiguous thereto is to be heated.

Under some circumstances, as where the material of the preformed plastic articles is relatively thin and relatively transparent, the intervening heating element may be heated by infra red rays from any suitable source which will penetrate the plastic virtually without raising its temperature, but will highly heat the intervening fuel element, particularly if such element is dark in color to absorb such rays. In this instance the heating element need not necessarily be metallic. If non-metallic, its softening temperature may be either above or below that of the plastic articles to be joined, depending on whether the joinder is to be accomplished by fusing the articles to each other or by fusing the intervening heating element to the respective articles.

Figure 5:
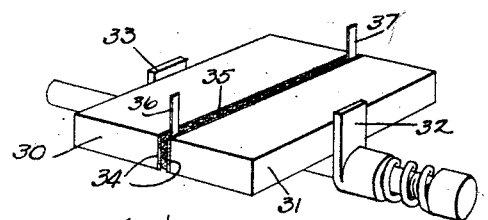
Fig. 5 is a view in section and perspective, diagrammatically illustrating parts assembled in accordance with an alternative method employing the invention.

As above intimated, while it is greatly preferred to practice the method of this invention in a case where both of the members to be joined are thermo-plastic, it is possible to practice the method where they are not. Fig. 5 shows an arrangement in which the members 30 and 31 are neither of them thermo-plastic. Provided only that they are of such material that a thermo-plastic substance, when fused, will bond thereto, it is possible to yieldingly press members 30 and 31 together between the clamping jaws 32 and 33 upon the thermo-plastic plies 34 and the intervening heating element 35 which, energized by the passage of a current therethrough by means of the connectors 36 and 37, may be made hot enough to fuse the thin plies 34 to embed the heating element and to connect the abutting margins of members 30 and 31.

In order that the plies 34 may fuse not only to each other but also to the margins of the non-thermo-plastic members 30 and 31, it is obviously necessary that the members 34 be sufficiently thin, or heated for a sufficient length of time, so that both their inner and outer surfaces will become fused. While this is satisfactory in many instances, it is not the preferred embodiment of the invention for the reason that the fusion effect is not as well equalized as it is where one or both of the primary members to be joined are of themselves thermo-plastic.

The use of a strip of screen cloth as a heating element has the great advantage that it is ideally adapted to permit free penetration of the fused surfaces contiguous to it, but except as hereinafter stated, we not do limit ourselves to any particular form of heating element.

The above described method of plastic fusion is almost unlimited in its scope of usefulness for many reasons. First, it produces a joint which is at least equal in strength to similar unfused portions of the preformed parts and which is vastly superior to the only joints which heretofore were believed practical in the structural assembly of plastic sections, namely, bolt or rivet joints. The fused joint produces a stronger and more rigid structure, and from an appearance standpoint it is much more acceptable to the user. The embedded heating element is not unsightly even if visible, and in many structures it is completely concealed from view. Where visible, it may be of a color to blend in with the adjacent plastic to become practically unnoticeable.

Secondly, it enables an operator to definitely limit the extent of the area to be joined, most of the heat being confined to the immediate vicinity of the heating element. Softening of the plastic portions surrounding the joints is minimized, and because the only portions which are substantially softened are held in clamped engagement during fusion, distortion of the sections being assembled does not occur.

Thirdly, it permits the fusion of complicated structures which could not be joined by either bolts or rivets, because when completely assembled they form an enclosure which precludes the installation or removal of either bolts or rivets. It is highly objectionable to resort to outwardly extending flanges in the assembly of enclosed structures, but such practice would be imperative were it not for the present method of joining.

Irrespective of thickness or shape, the present method permits of joining any thermo-plastic surfaces. Articles may be joined not only at their broad faces, but also along their edges, since the heating element may be made of any suitable width. While the tray-like component parts of my improved evaporator door are made hollow for purposes of economy, the principle involved in joining them in accordance with the disclosure of this application, would be the same if each component part were solid. Consequently, in effect, the present disclosure involves the "butt welding" of the margins of the component thermo-plastic sections.

Fourthly, the present method enables an operator to accurately control the amount of heat applied to the plastic surfaces being joined, thereby obtaining maximum results in fusing the material. A further advantage resides in the fact that the method may be successfully employed with very low cost equipment, thus making it applicable for use in the smallest shop.

Finally, my improved method actually reinforces the joint by means of the heating element which remains in the joint embedded in the fused surfaces of the respective parts.

We claim:

1. A method of connecting a substantially unyielding thermo-plastic member to another member with which it may be bonded under the influence of heat and pressure, consisting of providing said members with mating flanges, clamping said flanges together with a foraminous electrical resistance element interposed, passing an electrical current through said element to heat the contiguous surfaces of the flanges until said thermo-plastic material becomes sufficiently plastic to allow the element to become embedded therein under said clamping pressure, and until the mating surfaces of said flanges become fused, then disconnecting the electrical current supply and allowing the bonded flanges to cool.

2. An assembly of the character described, comprising the combination of a plurality of normally unyielding thermo-plastic members having finished outer surfaces and inner surfaces provided with mating flanges, and spaced metallic reenforcing means interposed between said flanges behind said inner surfaces and embedded in the material of said flanges, the abutting portions of said flanges being fused in the spaces between the metallic reenforcing means to produce a unitary structure substantially as described.

3. An assembly of the character described, comprising a plurality of thermo-plastic members having finished outer surfaces contiguous at a joint, and inner surfaces provided with mating marginal flanges, the margin of one of said members being shouldered to receive the margin of the other, whereby said flanges are offset from said joint, a piece of foraminous reenforcing material embedded in the material of the flanges, the opposing surfaces of the flanges being fused with each other behind and laterally offset from the joint in the spaces between the elements of the foraminous material, whereby to produce a unitary structure with outer finished surfaces unmarred by connecting means.

PHILIP A. SIDELL.
EDWARD J. WELLMAN.